United States Patent
Kenowski et al.

(10) Patent No.: US 9,034,455 B2
(45) Date of Patent: May 19, 2015

(54) BRANCHING CORE-PIN ASSEMBLY AND SYSTEM FOR FORMING BRANCHING CHANNELS

(75) Inventors: Michael A. Kenowski, Alpharetta, GA (US); Nathan C. Griffith, Roswell, GA (US); Donald J. McMichael, Roswell, GA (US); John A. Rotella, Roswell, GA (US)

(73) Assignee: AVENT, INC., Alpharetta, GA (US)

( * ) Notice: Subject to any disclaimer, the term of this patent is extended or adjusted under 35 U.S.C. 154(b) by 78 days.

(21) Appl. No.: 13/535,856

(22) Filed: Jun. 28, 2012

(65) Prior Publication Data
US 2014/0004370 A1    Jan. 2, 2014

(51) Int. Cl.
| | |
|---|---|
| B32B 3/24 | (2006.01) |
| B29C 33/50 | (2006.01) |
| B28B 7/28 | (2006.01) |
| B29C 45/26 | (2006.01) |
| B29C 45/36 | (2006.01) |

(52) U.S. Cl.
CPC ............... *B29C 33/505* (2013.01); *B28B 7/28* (2013.01); *Y10T 428/24339* (2015.01); *B29C 45/2628* (2013.01); *B29C 2045/363* (2013.01)

(58) Field of Classification Search
CPC ............................... B28B 7/28; B29C 33/505
USPC ................................. 425/277; 428/139
See application file for complete search history.

(56) References Cited

U.S. PATENT DOCUMENTS

| | | | | |
|---|---|---|---|---|
| 2,052,126 | A | * | 8/1936 | Brush ........................ 249/186 |
| 5,470,522 | A | * | 11/1995 | Thome et al. ............ 264/328.1 |
| 5,798,073 | A | | 8/1998 | Johnson et al. |
| 7,708,923 | B1 | | 5/2010 | Helicke et al. |
| 2008/0260986 | A1 | | 10/2008 | Smith |

FOREIGN PATENT DOCUMENTS

EP       1 457 300 A1    9/2004

* cited by examiner

*Primary Examiner* — William P Watkins, III
(74) *Attorney, Agent, or Firm* — Dority & Manning, PA

(57) ABSTRACT

A core-pin assembly composed of a primary core-pin and at least one secondary core-pin. The primary core-pin has a primary core-pin body defining at least one element for coupling with a mating end of at least one secondary core-pin. The secondary core-pin has a mating end and a secondary core-pin body. The mating end is configured to fit with the element defined in the primary core-pin body such that the primary core-pin and the secondary core-pin(s) reversibly join together to form a branching structure. The assembly may further include at least one tertiary core-pin and the secondary core-pin body may define at least one element for coupling with a mating end of at least one tertiary core-pin. The mating end of the tertiary core pin is configured to fit with the secondary core-pin body such that the primary core-pin, secondary and tertiary core-pin(s) reversibly join together forming a branching structure.

17 Claims, 6 Drawing Sheets

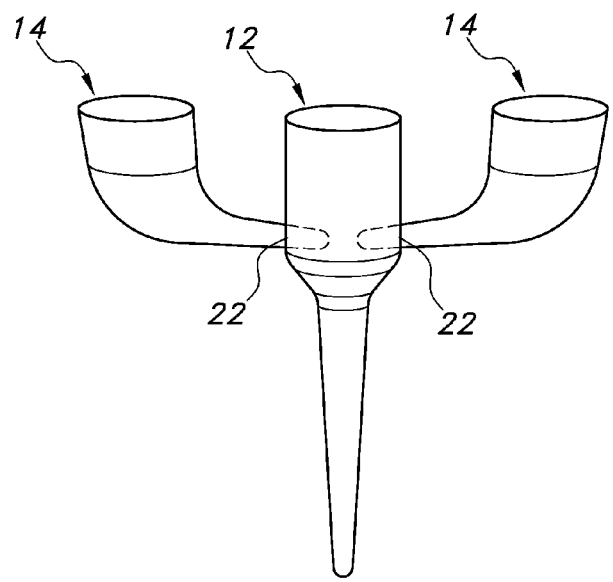
FIG. 4A
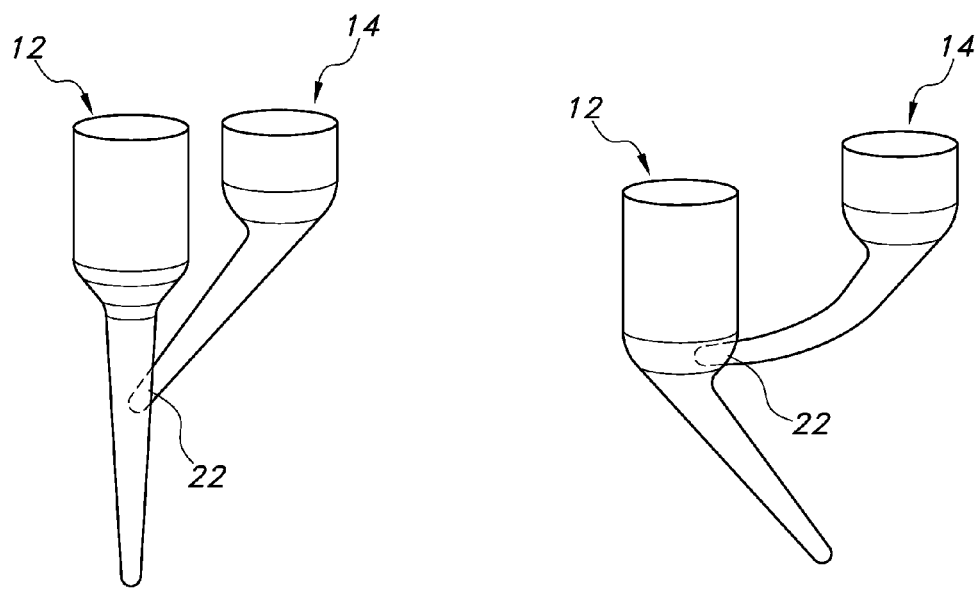
FIG. 4B
FIG. 4C

BRANCHING CORE-PIN ASSEMBLY AND SYSTEM FOR FORMING BRANCHING CHANNELS

FIELD OF THE INVENTION

The present invention relates to molded plastic articles and systems and methods for forming molded plastic articles.

BACKGROUND OF THE INVENTION

In order to form a hole or channel within a molded part, a core pin is typically used. The pin itself is usually formed of hard steel. During a forming process, after plastic flows around the core pin, the plastic cools and solidifies. When the core pin is pulled out of the part, a channel defined by the core pin is formed through the solidified plastic. The channel may be a straight channel. Alternatively, the channel may be a non-linear channel as generally described in U.S. Patent Application Publication No. US 2008/0260986 A1 by Smith. Multiple parallel channels may be formed by providing multiple core pins as generally described in U.S. Pat. No. 5,798,073 to Johnson et al.

While these references disclose improvements, each fails to recognize or address the need for a molded component that has branching channels. Meeting this need is important because molded components having branching channels are desirable in applications that involve the transfer or distribution of fluids or liquids. For example, compact components used for the transfer of fluids or liquids in various devices including medical devices.

The need is apparent for molded articles having non-linear branching channels that allow for compact construction. The need extends to a system and method for forming molded components having branching channels. For example, there is a need for a system and method for reliable, high-speed and accurate production with low waste. This extends to systems and method for forming molded components having non-linear branching channels and is especially apparent for a system and method of reliable, high-speed and accurate production of molded components having non-linear branching channels.

BRIEF SUMMARY OF THE INVENTION

The problems described above are addressed by the present invention which encompasses a branching core-pin assembly composed of a primary core-pin and at least one secondary core-pin. The primary core-pin has a first end, a second end and a primary core-pin body connecting the first end and the second end. The primary core-pin body defines at least one element for coupling with a mating end of at least one secondary core-pin. The secondary core-pin has a mating end, a second end, and a secondary core-pin body connecting the mating end and the second end of the secondary core pin. The mating end is configured to fit with the element defined in the primary core-pin body such that the primary core-pin and the at least one secondary core-pin reversibly join together to form a branching structure.

The secondary core-pin body may define at least one element for coupling with a mating end of at least one tertiary core-pin. The assembly may further include at least one tertiary core-pin. The tertiary core pin has a mating end, a second end, and a tertiary core-pin body connecting the mating end and the second end of the tertiary core pin. The mating end is configured to fit with the element defined in the secondary core-pin body such that the primary core-pin and the at least one secondary core-pin and the at least one tertiary core-pin reversibly join together to form a branching structure. It is contemplated that additional levels of core pins may be utilized. For example, one or more quaternary, quinary (etc.) core-pins may be utilized. According to an aspect of the invention, the assembly may form a dichotomously branching structure, a monopodially branching structure, or a sympodially branching structure.

In another aspect of the invention, one or more of the primary core-pins, one or more of the secondary core-pins, or one or more of the tertiary core-pins may be non-linear. Of course, if quaternary, quinary (etc.) core pins are utilized, they may be non-linear. The core-pins are desirably formed of a flexible plastic that had a melting point that is higher than the flowable material used to form molded articles around the core-pins.

The present invention encompasses a system for forming branching channels through a molded component. The system includes a forming device having a molding chamber. The system also includes a branching core-pin assembly positioned within the molding chamber. The branching core-pin assembly includes a primary core-pin having a first end, a second end and a primary core-pin body connecting the first end and the second end. The primary core-pin body defines at least one element for coupling with a mating end of at least one secondary core-pin. The branching core-pin assembly also includes at least one secondary core-pin. The secondary core pin has a mating end, a second end, and a secondary core-pin body connecting the mating end and the second end of the secondary core pin. The mating end is configured to fit with the element defined in the primary core-pin body such that the primary core-pin and the at least one secondary core-pin reversibly join together to form a branching structure.

According to the system, plastic is injected into the molding chamber and flows around the branching core-pin assembly to form the molded component. When the branching core-pin assembly is removed from the molded component after the plastic solidifies so the molded component defines branching channels.

In one aspect of the system, the secondary core-pin body defines at least one element for coupling with a mating end of at least one tertiary core-pin and the branching core-pin assembly further includes at least one tertiary core-pin. The tertiary core pin has a mating end, a second end, and a tertiary core-pin body connecting the mating end and the second end of the tertiary core pin. The mating end is configured to fit with the element defined in the secondary core-pin body such that the primary core-pin and the at least one secondary core-pin and the at least one tertiary core-pin reversibly join together to form a branching structure. According to the system, one or more of the primary or secondary or tertiary core-pins may be non-linear.

The present invention also encompasses a molded work-piece. The molded work-piece includes: a molded body formed of a plastic material; and a branching core-pin assembly positioned within the body. The branching core-pin assembly is an assembly as described above. Plastic material surrounds the branching core-pin assembly so the branching core-pin assembly defines a branching structure in which the first end and second end of the primary core-pin and a second end of at least one secondary core-pin extends from the molded body such that, upon removal of the branching core-pin assembly, the molded body defines branching channels.

In an aspect of the invention, the branching core-pin assembly may include one or more tertiary core-pins such so the first end and second end of the primary core-pin and a second end of at least one secondary core-pin and a second end of at least one tertiary core-pin extends from the molded body such that, upon removal of the branching core-pin assembly, the molded body defines branching channels. According to the invention, the one or more of the primary or secondary or tertiary core-pins in the work-piece may be non-linear.

Other objects, advantages and applications of the present disclosure will be made clear by the following detailed description of a preferred embodiment of the disclosure and the accompanying drawings wherein reference numerals refer to like or equivalent structures.

DESCRIPTION OF THE DRAWINGS

FIG. 4A is a side perspective view illustration of an exemplary branching core-pin assembly showing an exemplary primary core-pin configured with two exemplary secondary core-pins.

FIG. 4B is a side perspective view illustration of another exemplary branching core-pin assembly showing an exemplary primary core-pin and an exemplary secondary core-pin.

FIG. 4C is a side perspective view illustration of another exemplary branching core-pin assembly showing an exemplary primary core-pin and an exemplary secondary core-pin.

DETAILED DESCRIPTION

Figure 1:
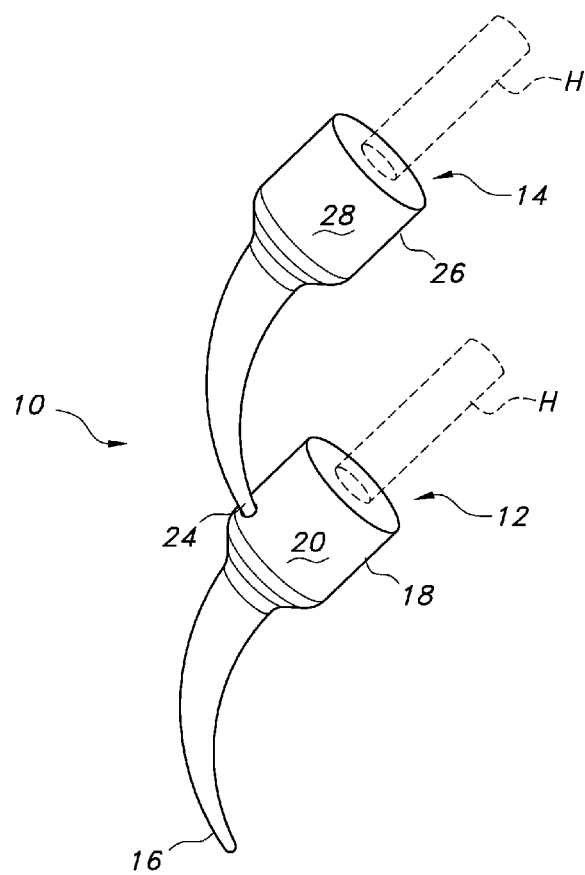
FIG. 1 is a side perspective view illustration of an exemplary branching core-pin assembly showing an exemplary primary core-pin and an exemplary secondary core-pin.

Reference will now be made in detail to one or more embodiments, examples of which are illustrated in the drawings, such drawings are not necessarily to scale. It should be understood that features illustrated or described as part of one embodiment may be used with another embodiment to yield still a further embodiment.

Figure 2A:
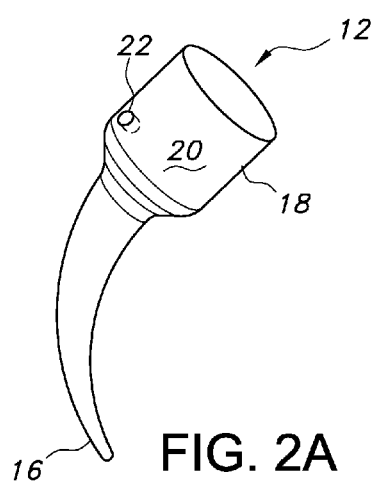
FIG. 2A is a side perspective view illustration of an exemplary primary core-pin of the branching core-pin assembly of FIG. 1.
Figure 2B:
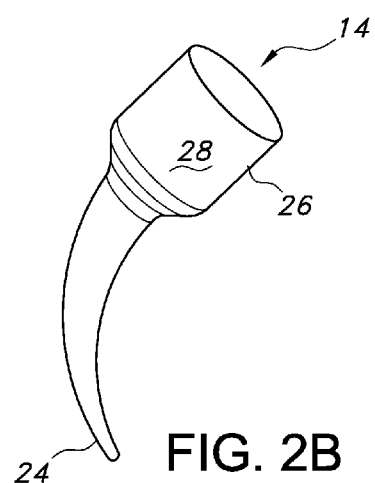
FIG. 2B is a side perspective view illustration of an exemplary secondary core-pin of the branching core-pin assembly of FIG. 1.

Turning now to the drawings, there is shown in side perspective view at FIG. 1, an exemplary branching core-pin assembly 10 composed of a primary core-pin 12 and at least one secondary core-pin 14. Referring also to FIGS. 2A and 2B which illustrate individual primary and secondary core-pins in side perspective view, the primary core-pin 12 has a first end 16, a second end 18 and a primary core-pin body 20 connecting the first end 16 and the second end 18. The primary core-pin body 20 defines at least one element 22 for coupling with a mating end 24 of at least one secondary core-pin 14. The secondary core-pin 14 has a mating end 24, a second end 26, and a secondary core-pin body 28 connecting the mating end 24 and the second end 26 of the secondary core pin 14. The mating end 26 is configured to fit with the element 22 defined in the primary core-pin body 12 such that the primary core-pin 12 and the at least one secondary core-pin 14 reversibly join together to form a branching structure or branching assembly 10. For ease of illustration, a handle or prong "H" extending from each respective core-pin body 20, 28 are shown in broken lines only in FIG. 1. Such handle "H" is used to hold and manipulate the core-pin and extract the core-pin from a mold or molded article.

Figure 2C:
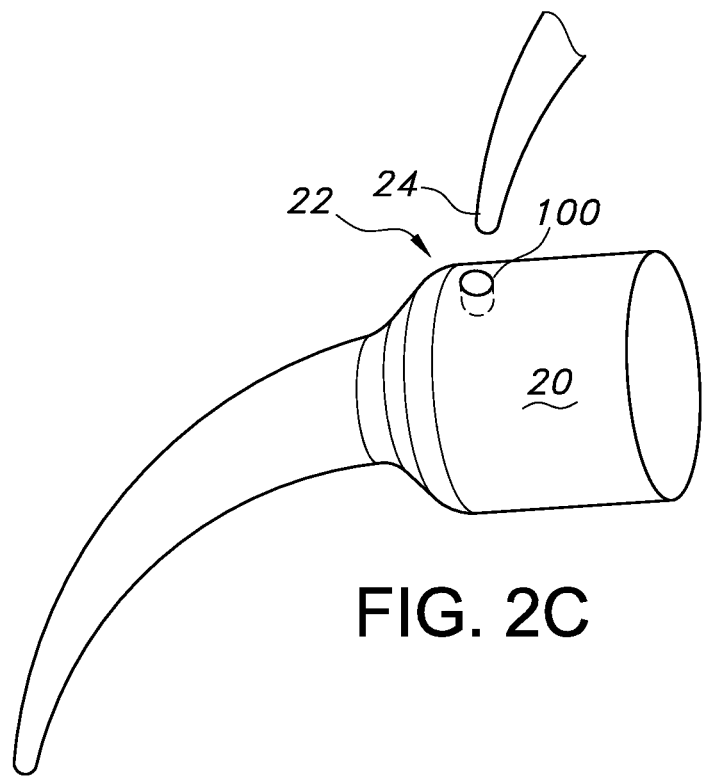
FIG. 2C is a side perspective view illustration of an exemplary primary core-pin and secondary core-pin showing a detail of an element for coupling the core-pins.
Figure 2D:
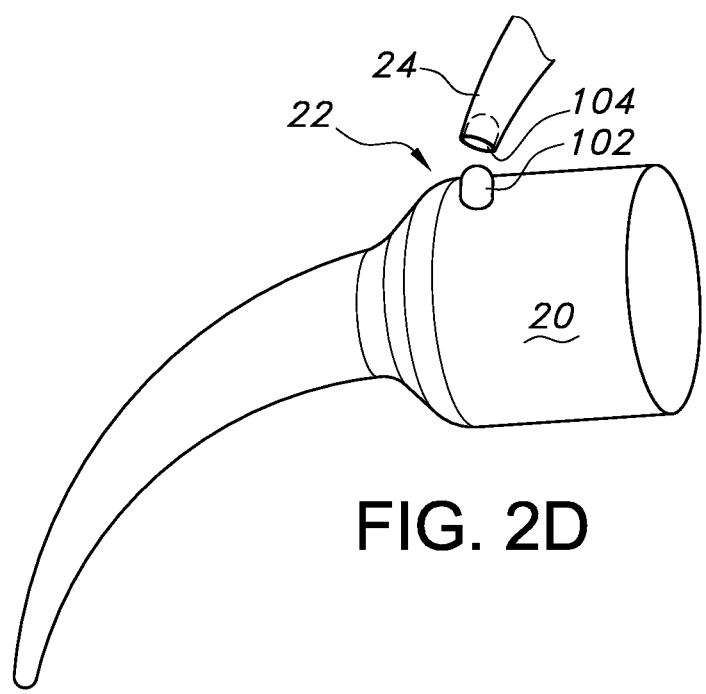
FIG. 2D is a side perspective view illustration of an exemplary primary core-pin and secondary core-pin showing a detail of an element for coupling the core-pins.

Referring to FIG. 2C, there is shown in perspective view a detail of an exemplary element 22 located on a primary core-pin body 20 for coupling with a mating end 24 of at least one secondary core-pin 14. As seen in FIG. 2C, the element 22 is in the form of a cavity or recess 100 defined in the primary core-pin body 20 that fits with or matches the end 24 of the secondary core-pin 24. Of course, other configurations are contemplated. For example, FIG. 2D illustrates in perspective view a detail of an exemplary alternative element 22 located on a primary core-pin body 20 for coupling with an alternative mating end 24 of at least one secondary core-pin 14. As seen in FIG. 2C, the element 22 is in the form of a protuberance or knob 102 that fits with or matches a recess or cavity 104 defined in the end 24 of the secondary core-pin 24.

Figure 3:
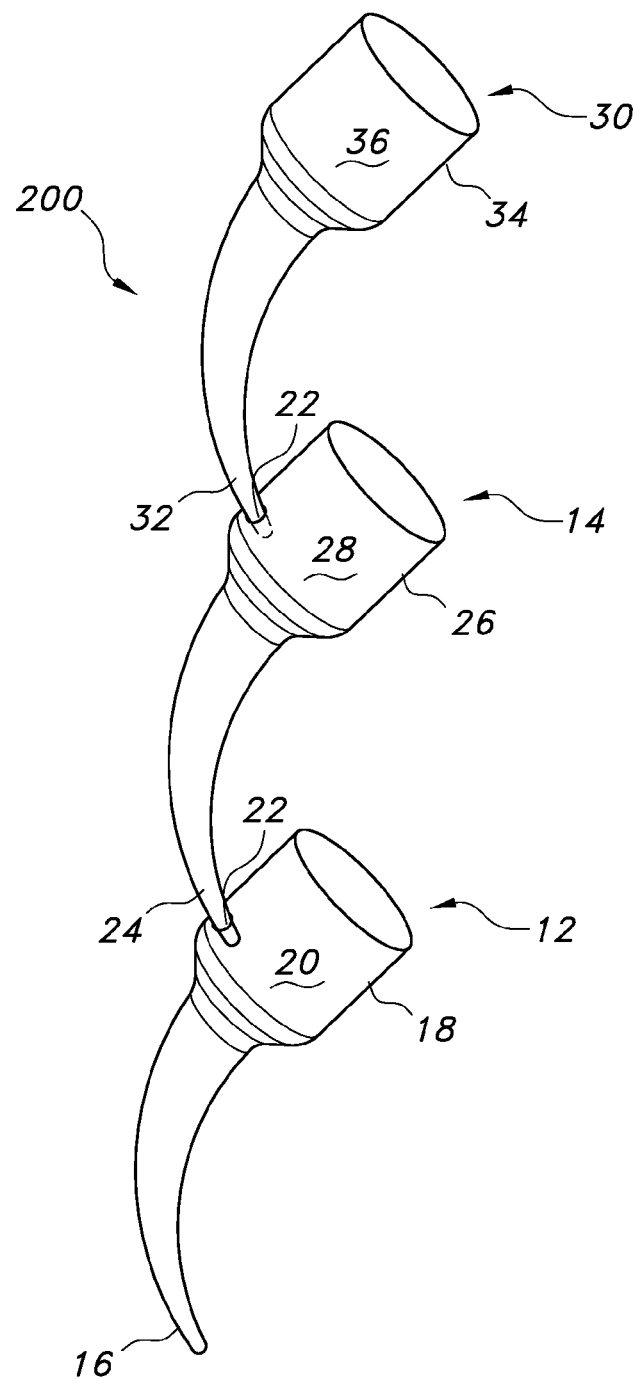
FIG. 3 is a side perspective view illustration of an exemplary branching core-pin assembly showing an exemplary primary core-pin, an exemplary secondary core-pin, and an exemplary tertiary core-pin.

According to the present invention and referring now to FIG. 3 of the drawings, there is illustrated in perspective view an exemplary assembly 200 composed of a primary core-pin 12, a secondary core-pin 14, and a tertiary core-pin 30. The secondary core-pin body 14 (illustrated at, for example FIG. 2B) may define at least one element 22 for coupling with a mating end 32 of at least one tertiary core-pin 30 as shown in FIG. 3. The tertiary core pin 30 has a mating end 32, a second end 34, and a tertiary core-pin body 36 connecting the mating end 32 and the second end 34 of the tertiary core pin 30. The mating end 32 is configured to fit with the element 22 defined in the secondary core-pin body 14 such that the primary core-pin 14 and the at least one secondary core-pin 14 and the at least one tertiary core-pin 30 reversibly join together to form a branching structure. It is contemplated that additional levels of core pins may be utilized. For example, one or more quaternary, quinary (etc.) core-pins may be utilized. According to an aspect of the invention, the assembly may form a dichotomously branching structure, a monopodially branching structure, or a sympodially branching structure.

Referring now to FIG. 4 of the drawings, there is shown in side perspective view an illustration of a primary core pin 12 with two secondary core pins 14 coupled with the primary core pin 14 to form a branching structure. It is contemplated that additional secondary core pins may be coupled with the primary core pin if additional branches from the primary core pin are desired. One or more tertiary core pins (not shown in FIG. 4) may be coupled with one or both of the secondary core pins 14 to form a more highly branched structure.

As can be seen from FIGS. 1 through 4, the core pins may be linear or non-linear. That is, one or more of the primary core-pins, one or more of the secondary core-pins, or one or more of the tertiary core-pins may be non-linear—or combinations of linear and non-linear core-pins may be used. Of course, if courses or layers of core pins (e.g., quaternary, quinary (etc.) core pins) are utilized, they may be linear, non-linear or combinations of the same. Desirably, the core-pins may be formed of plastic. Even more desirably, the core-pins may be formed of a flexible plastic that can flex as it is withdrawn from a molded article formed around the core-pin. The plastic should have a higher melting point than the flowable material used with the core-pins to form a molded component or article.

Generally speaking, the core-pins may be configured to fit together at a variety of angles. While the drawings generally illustrate the mating end of the core-pin fitting together or coupling with the corresponding element on/in the respective core-pin body coming together at approximately right-angles (e.g., orthogonally), the coupling of the core-pins may be at other angles (i.e., non-orthogonal). For example, the coupling may form an angle in the range of from about 75 degrees to about 15 degrees. As another example, the coupling may form an angle in the range of from about 65 degrees to about 25 degrees. As yet another example, the coupling may form an angle in the range of from about 55 degrees to about 35 degrees.

As can be seen in the figures, the core-pins can be funnel-shaped. That is, the core-pins may generally taper from a first end to a second opposite end. The taper may be gradual and consistent or it may vary to form, for example, channels having a large diameter at one end that tapers sharply to a first, smaller diameter and then tapers much more gradually to a second, smaller diameter. It is contemplated that the core-pins may have a variety of shapes or configurations. For example, the core-pin may have a round cross-section, a triangular cross-section, a rectangular cross-section, a square cross-section, a pentagonal (or other polygonal) cross-section, and combinations of the same.

The core-pins are generally illustrated as having a radius of curvature at least along the first end of the core-pin. See, for example, FIGS. 1, 2A, 2B, and 3. One or more of the core-pins may be configured to have little or no radius of curvature as generally illustrated in FIGS. 4A, 4B and 4C.

Figure 5:
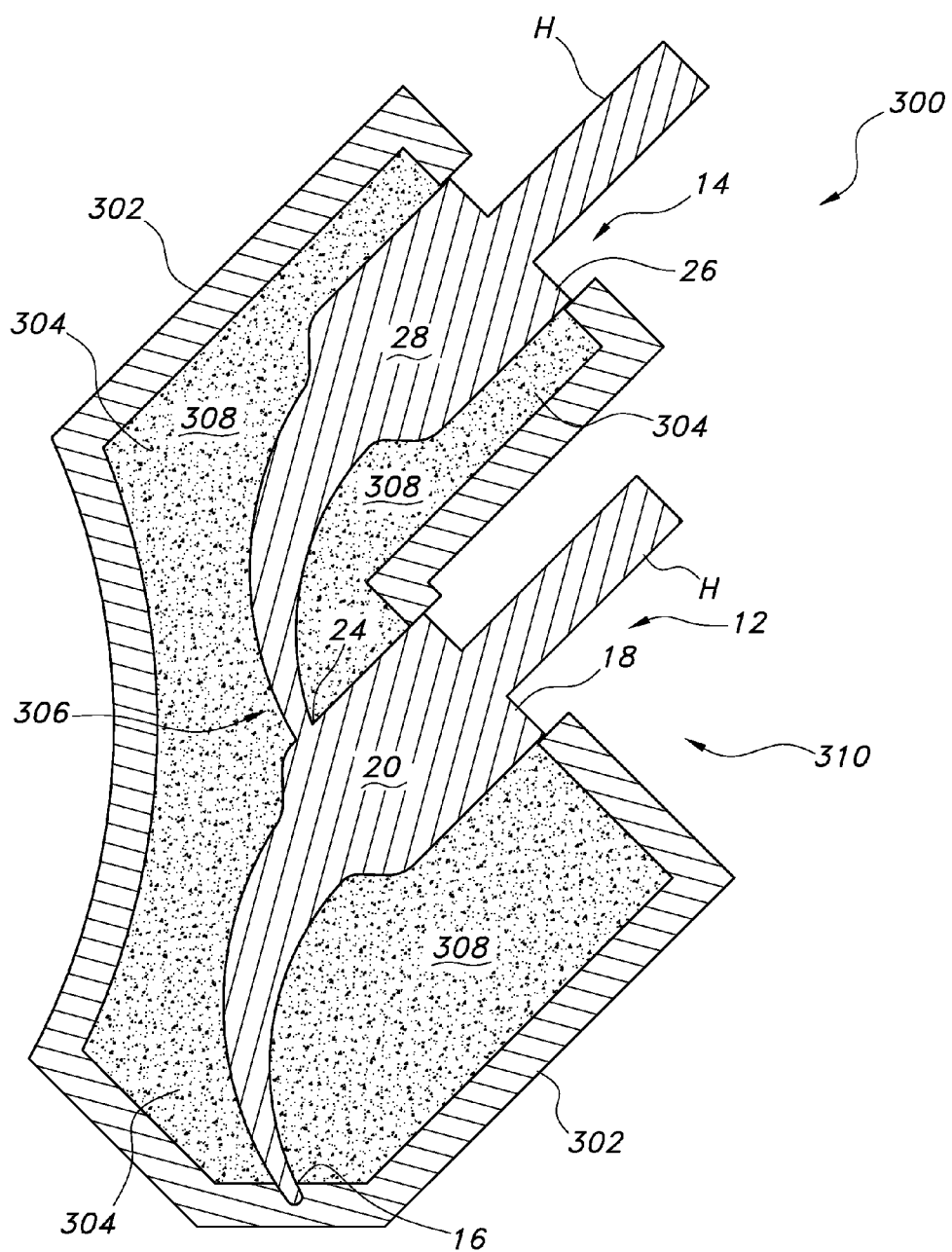
FIG. 5 is a side cross-sectional view illustrating an exemplary system for forming branching channels in a molded component utilizing a branching core-pin assembly.

The present invention encompasses a system for forming branching channels in a molded component. Referring now to FIG. 5 of the drawings, there is shown in side, cross-sectional view an illustration of an exemplary system 300 for forming branching channels in a molded component. The system 300 includes a forming device 302 having a molding chamber 304. The system also includes a branching core-pin assembly 306 positioned within the molding chamber 304. The branching core-pin assembly includes a primary core-pin 12 having a first end 16, a second end 18 and a primary core-pin body 20 connecting the first end 16 and the second end 18. The primary core-pin body 20 defines at least one element 22 for coupling with a mating end 26 of at least one secondary core-pin 14. The secondary core also has a second end 26, and a secondary core-pin body 28 connecting the mating end 24 and the second end 26 of the secondary core pin 14. The mating end 26 is configured to fit with the element 22 defined in the primary core-pin body 12 such that the primary core-pin and the at least one secondary core-pin reversibly join together to form a branching structure. As illustrated in FIG. 5, one or more of the primary or secondary core-pins may be non-linear. Of course, one or more of the primary or secondary core-pins may be linear—or combinations of linear and non-linear core-pins may be used.

Figure 6:
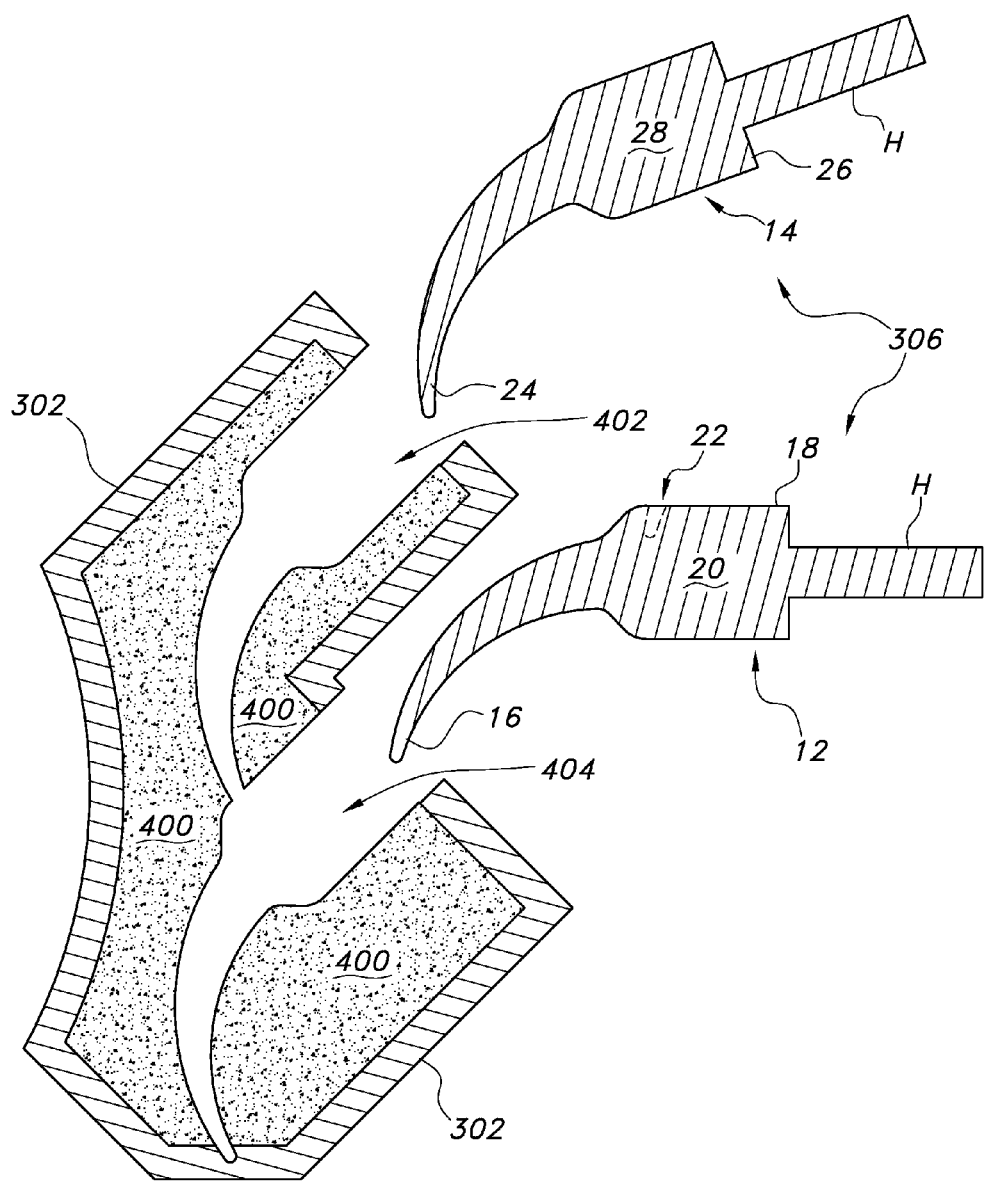
FIG. 6 is a side cross-sectional view illustrating a detail from the system of FIG. 6 showing the branching core-pin assembly removed from a molded component.

According to the system, a flowable material such as, for example, a thermoplastic polymer 308 is injected into the molding chamber via a sprue (not shown) and flows around the branching core-pin assembly 306 to form a work-piece 310 composed of a molded component 312 and the branching core-pin assembly 306. Referring to FIG. 6, when the branching core-pin assembly 306 is removed from the molded component 400 after the plastic is solidified (either while the molded component 400 is retained within the forming device 302 or after the molded component 400 is extracted from the forming device 302); the molded component 400 defines branching channels 402, 404. As illustrated in FIG. 6, the branching channels may be non-linear. Of course, one or more of the branching channels may be linear—or combinations of linear and non-linear channels may be formed. The branching core-pin assembly 306 may be removed by removing the secondary core-pin 14 first and then removing the primary core-pin 12. Alternatively, the branching core-pin assembly 306 may be removed by removing the secondary core-pin 14 and the primary core-pin 12 simultaneously.

As discussed above with respect to the core-pin assembly, the system of the present invention contemplates a secondary core-pin body that may define at least one element for coupling with a mating end of at least one tertiary core-pin and the branching core-pin assembly further includes at least one tertiary core-pin. The tertiary core pin has a mating end, a second end, and a tertiary core-pin body connecting the mating end and the second end of the tertiary core pin. The mating end is configured to fit with the element defined in the secondary core-pin body such that the primary core-pin and the at least one secondary core-pin and the at least one tertiary core-pin reversibly join together to form a branching structure. According to the system, one or more of the primary or secondary or tertiary core-pins may be non-linear, linear or combinations thereof.

The present invention also encompasses a molded work-piece. The molded work-piece includes: a molded body formed of a plastic material; and a branching core-pin assembly positioned within the body. The branching core-pin assembly is an assembly as described above. Plastic material surrounds the branching core-pin assembly so the branching core-pin assembly defines a branching structure in which the first end and second end of the primary core-pin and a second end of at least one secondary core-pin extends from the molded body such that, upon removal of the branching core-pin assembly, the molded body defines branching channels.

In an aspect of the invention, the branching core-pin assembly may include one or more tertiary core-pins such so the first end and second end of the primary core-pin and a second end of at least one secondary core-pin and a second end of at least one tertiary core-pin extends from the molded body such that, upon removal of the branching core-pin assembly, the molded body defines branching channels. According to the invention, the one or more of the primary or secondary or tertiary core-pins in the work-piece may be non-linear.

While various patents have been incorporated herein by reference, to the extent there is any inconsistency between incorporated material and that of the written specification, the written specification shall control. In addition, while the disclosure has been described in detail with respect to specific embodiments thereof, it will be apparent to those skilled in the art that various alterations, modifications and other changes may be made to the disclosure without departing from the spirit and scope of the present disclosure. It is therefore intended that the claims cover all such modifications, alterations and other changes encompassed by the appended claims.

What is claimed is:

1. A core-pin assembly, the assembly comprising:
a primary core-pin having a first end, a second end and a primary core-pin body connecting the first end and the second end, the primary core-pin body defining at least one element for coupling with a mating end of at least one secondary core-pin, the at least one element for coupling being located between the first end and the second end of the primary core-pin body;

at least one secondary core-pin, the secondary core pin having a mating end, a second end, and a secondary core-pin body connecting the mating end and the second end of the secondary core pin, the mating end configured to fit with the element defined in the primary core-pin body, wherein the at least one secondary core-pin is reversibly joined to the primary core-pin at the mating element located between the first end and the second end of the primary core-pin body to form a branching structure.

2. The assembly of claim 1, wherein the secondary core-pin body defines at least one element for coupling with a mating end of at least one tertiary core-pin, the at least one element for coupling being located between the first end and the second end of the secondary core-pin body and wherein the assembly further comprises at least one tertiary core-pin, the tertiary core pin having a mating end, a second end, and a tertiary core-pin body connecting the mating end and the second end of the tertiary core pin, the mating end configured to fit with the mating element defined in the secondary core-pin body such that the at least one secondary core-pin is reversibly joined to the primary core-pin at the mating element located between the first end and the second end of the primary core-pin body and the at least one tertiary core-pin is reversibly joined to the secondary core-pin at the mating element located between the first end and the second end of the secondary core-pin body to form a branching structure.

3. The assembly of claim 2, wherein the assembly forms a dichotomously branching structure, a monopodially branching structure, or a sympodially branching structure.

4. The assembly of cairn 1, wherein one or more of the primary or secondary core-pins is non-linear.

5. The assembly of claim 2, wherein one or more of the primary or secondary or tertiary core-pins is non-linear.

6. The assembly of claim 1, wherein at least one of the primary or secondary core-pins is formed of plastic.

7. The assembly of claim 2, wherein one or more of the primary, secondary or tertiary core-pins is formed of plastic.

8. A system for forming a branching channels through a molded component comprising:
a forming device having a molding chamber; and
a branching core-pin assembly positioned within the molding chamber, the branching core-pin assembly comprising:
a primary core-pin having a first end, a second end and a primary core-pin body connecting the first end and the second end, the primary core-pin body defining at least one element for coupling with a mating end of at least one secondary core-pin, the at least one element for coupling being located between the first end and the second end of the primary core-pin body;
at least one secondary core-pin, the secondary core pin having a mating end, a second end, and a secondary core-pin body connecting the mating end and the second end of the secondary core pin, the mating end configured to fit with the element defined in the primary core-pin body,
wherein the at least one secondary core-pin is reversibly joined to the primary core-pin at the mating element located between the first end and the second end of the primary core-pin body to form a branching structure,
wherein plastic is injected into the molding chamber and flows around the branching core-pin assembly to form the molded component, and further wherein the branching core-pin assembly is removed from the molded component after the plastic solidifies so the molded component defines branching channels.

9. The system of claim 8, wherein the secondary core-pin body defines at least one element for coupling with a mating end of at least one tertiary core-pin, the at least one element for coupling being located between the first end and the second end of the secondary core-pin body and wherein the branching core-pin assembly further comprises at least one tertiary core-pin, the tertiary core pin having a mating end, a second end, and a tertiary core-pin body connecting the mating end and the second end of the tertiary core pin, the mating end configured to fit with the element defined in the secondary core-pin body such that the at least one secondary core-pin is reversibly joined to the primary core-pin at the mating element located between the first end and the second end of the primary core-pin body and the at least one tertiary core-pin is reversibly joined to the secondary core-pin at the mating element located between the first end and the second end of the secondary core-pin body to form a branching structure.

10. The system of claim 9, wherein the branching core-pin assembly forms a dichotomously branching structure, a monopodially branching structure, or a sympodially branching structure, 11. The system of claim 8, wherein one or more of he primary or secondary core-pins is non-linear.

12. The system of claim 9, wherein one or more of the primary or secondary or tertiary core-pins is non-linear.

13. A molded work-piece comprising:
a molded body comprising a plastic material; and
a branching core-pin assembly positioned within the body, the branching core-pin assembly comprising:
a primary core-pin having a first end, a second end and a primary core-pin body connecting the first end and the second end, the primary core-pin body defining at least one element for coupling with a mating end of at least one secondary core-pin, the at least one element for coupling being located between the first end and the second end of the primary core-pin body;
at least one secondary core-pin, the secondary core pin having a mating end, a second end, and a secondary core-pin body connecting the mating end and the second end of the secondary core pin, the mating end configured to fit with the element defined in the primary core-pin body,
wherein the at least one secondary core-pin is reversibly joined to the primary core-pin at the mating element located between the first end and the second end of the primary core-pin body to form a branching structure,
wherein the plastic material surrounds the branching core-pin assembly so the branching core-pin assembly defines a branching structure in which the first end and second end of the primary core-pin and a second end of at least one secondary core-pin extends from the molded body such that, upon removal of the branching core-pin assembly, the molded body defines one or more primary channels that branch into secondary channels.

14. The molded work-piece of claim 13, wherein the secondary core-pin body defines at least one element for coupling with a mating end of at least one tertiary core-pin, the at least one element for coupling being located between the first end and the second end of the secondary core-pin body and wherein the branching core-pin assembly further comprises at least one tertiary core-pin, the tertiary core pin having a mating end, a second end, and a tertiary core-pin body connecting the mating end and the second end of the tertiary core pin, the mating end configured to fit with the element defined in the secondary core-pin body such that the at least one secondary core-pin is reversibly joined to the primary core-pin at the mating element located between the first end and the second end of the primary core-pin body and the at least one tertiary core-pin is reversibly joined to the secondary core-pin at the mating element located between the first end and the second end of the secondary core-pin body to form a branching structure and in which the first end and second end of the primary core-pin and a second end of at least one secondary core-pin and a second end of at least one tertiary core-pin extends from the molded body such that, upon removal of the branching core-pin assembly, the molded body defines one or more primary channels that branch into one or more secondary channels that branch into one or more tertiary channels.

15. The molded work-piece of claim 14, wherein the branching core-pin assembly forms a dichotomously branching structure, a monopodially branching structure, or a sympodially branching structure.

16. The molded work-piece of claim 13, wherein one or more of the primary or secondary core-pins is non-linear.

17. The molded work-piece of claim 14, wherein one or more of the primary or secondary or tertiary core-pins is non-linear.

* * * * *